(12) United States Patent
Yanai et al.

(10) Patent No.: US 7,452,636 B2
(45) Date of Patent: Nov. 18, 2008

(54) LITHIUM SECONDARY BATTERY

(75) Inventors: Atsushi Yanai, Kobe (JP); Katsunori Yanagida, Itami (JP); Yoshinori Kida, Kobe (JP); Takaaki Ikemachi, Kobe (JP); Toshiyuki Nohma, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 611 days.

(21) Appl. No.: 10/792,281

(22) Filed: Mar. 4, 2004

(65) Prior Publication Data

US 2004/0224235 A1    Nov. 11, 2004

(30) Foreign Application Priority Data

Mar. 6, 2003    (JP) .............................. 2003-059683

(51) Int. Cl.
*H01M 10/40* (2006.01)

(52) U.S. Cl. ...................................... 429/337; 429/330

(58) Field of Classification Search ........................ None
See application file for complete search history.

(56) References Cited

U.S. PATENT DOCUMENTS 6,022,518 A * 2/2000 Yamazaki et al. ........... 423/448

2002/0009649 A1 * 1/2002 Sato et al. .................... 429/306
2004/0101763 A1    5/2004 Kotato et al. ................. 429/331
2004/0191636 A1    9/2004 Kida et al. ................... 429/330
2004/0224230 A1   11/2004 Yanagida et al. ......... 429/231.8

FOREIGN PATENT DOCUMENTS

| JP | 10-152311 A | 6/1998 |
| JP | 2001-6729 A | 1/2001 |
| JP | 2001-297794 A | 10/2001 |
| JP | 2002-324580 A | 11/2002 |
| JP | 2002-343430 A | 11/2002 |

* cited by examiner

*Primary Examiner*—Patrick Ryan
*Assistant Examiner*—Robert Hodge
(74) *Attorney, Agent, or Firm*—Kubovcik & Kubovcik

(57) ABSTRACT

A lithium secondary battery including a positive electrode, a negative electrode including a carbon material as an active material, and a nonaqueous electrolyte comprising a solute dissolved in a nonaqueous solvent in which γ-butyrolactone is the main solvent, wherein the carbon material has a ratio ($I_D/I_G$) of a Raman spectrum intensity (a peak intensity ratio) (R) obtained by Raman spectroscopy of 0.2 or greater, and the nonaqueous electrolyte includes at least 0.1 part by weight of vinylene carbonate and at least 0.1 part by weight of vinyl ethylene carbonate in 100 parts by weight of the nonaqueous electrolyte.

2 Claims, 1 Drawing Sheet

LITHIUM SECONDARY BATTERY

FIELD OF THE INVENTION

The present invention relates to a lithium secondary battery comprising a positive electrode, a negative electrode including a carbon material as an active material and a nonaqueous electrolyte. The present invention is especially characterized in an improvement of a lithium secondary battery wherein the nonaqueous electrolyte comprises γ-butyrolactone as a main solvent. That is, in the present invention, occluding and releasing of lithium ion by the carbon material of the negative electrode properly occur to provide excellent discharge characteristics to the lithium secondary battery.

BACKGROUND OF THE INVENTION

A lithium secondary battery having high electromotive force that comprises a nonaqueous electrolyte and utilizes oxidation and reduction of lithium has recently been used as one of new type high output and high energy density batteries.

In such lithium secondary batteries, a carbon material such as graphite, coke, and the like, capable of occluding and releasing lithium ion, is commonly used as a material for the negative electrode.

As the nonaqueous solvent to be used for the nonaqueous electrolyte, ethylene carbonate, propylene carbonate, butylene carbonate, sulfolan, γ-butyrolactone, ethylmethyl carbonate, and the like, have conventionally been used alone or in various combinations thereof.

γ-Butyrolactone having a high boiling point and excellent heat stability has recently been attracting attention for use as the nonaqueous solvent to improve the safety of the lithium secondary battery.

However, when γ-butyrolactone is used as the nonaqueous solvent, a surface film having excellent mobility of lithium ion cannot be formed on the surface of the carbon material used for the negative electrode and charge and discharge become difficult. γ-Butyrolactone is decomposed as a side reaction and storage characteristics of the battery are deteriorated.

It has been proposed to add ethylene carbonate capable of forming a surface film having excellent mobility of lithium ion on the surface of the carbon material to a nonaqueous solvent including γ-butyrolactone.

If an amount of ethylene carbonate added to the nonaqueous solvent including γ-butyrolactone is not sufficient, a surface film having excellent mobility of lithium ion is not formed on the surface of the carbon material. On the other hand, if an amount of ethylene carbonate added to the nonaqueous solvent including γ-butyrolactone is too great, heat stability of the nonaqueous electrolyte is reduced and safety of the lithium secondary battery cannot be sufficiently improved.

It has also recently been proposed to add vinyl ethylene carbonate to a nonaqueous solvent to improve charge discharge efficiency of the lithium secondary battery, and storage characteristics and charge discharge cycle characteristics at a high temperature (see, for example, Japanese Laid-open Publication No. 2001-6729).

However, even if vinyl ethylene carbonate is added to the nonaqueous solvent, discharge characteristics of the lithium secondary battery still cannot be sufficiently improved.

OBJECT OF THE INVENTION

An object of the present invention is to solve the problems described above of a lithium secondary battery comprising a positive electrode, a negative electrode including a carbon material and a nonaqueous electrolyte. More specifically, an object of the present invention is to provide proper occluding and releasing of lithium ion by the carbon material of the negative electrode in a lithium secondary battery having a nonaqueous electrolyte prepared using γ-butyrolactone as the main solvent of a nonaqueous solvent so as to improve discharge characteristics and storage characteristics.

SUMMARY OF THE INVENTION

According to the present invention a lithium secondary battery is provided which includes a positive electrode, a negative electrode including a carbon material as an active material, and a nonaqueous electrolyte comprising a solute dissolved in a nonaqueous solvent in which γ-butyrolactone is the main solvent, wherein the carbon material has a ratio $(I_D/I_G)$ of a Raman spectrum intensity (a peak intensity ratio) (R) obtained by Raman spectroscopy of 0.2 or greater, and the nonaqueous electrolyte includes at least 0.1 part by weight of vinylene carbonate and at least 0.1 part by weight of vinyl ethylene carbonate in 100 parts by weight of the nonaqueous electrolyte.

EXPLANATION OF ELEMENTS

Figure 1:
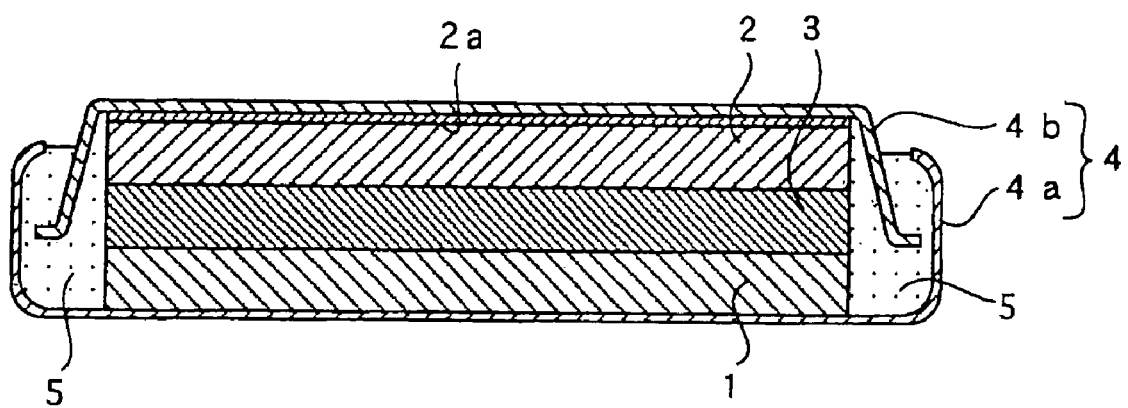
FIG. 1 is a cross section of a test battery prepared in Examples and Comparative examples showing internal structure of the battery.

1: counter electrode (positive electrode)
2: working electrode (negative electrode)
2a: current collector
3: separator
4: battery can
4a: bottom part
4b: upper lid
5: insulation packing

DETAILED EXPLANATION OF THE INVENTION

When at least 0.1 part by weight of vinylene carbonate and at least 0.1 part by weight of vinyl ethylene carbonate are included in 100 parts by weight of the nonaqueous electrolyte, even if the carbon material has an R value $(I_D/I_G)$ of 0.2 or higher, a surface film having excellent mobility of lithium ion is formed on the surface of the carbon material and occluding and releasing of lithium ion by the carbon material occur properly and a side reaction, decomposition of γ-butyrolactone, is suppressed to obtain a lithium secondary battery having excellent heat stability as well as having improved discharge characteristics and storage characteristics.

The ratio of the Raman spectrum intensity (R) $(I_D/I_G)$ is a ratio of a peak intensity at 1360 cm$^{-1}$ $(I_D)$ to a peak intensity at 1580 cm$^{-1}$ $(I_G)$ as measured using argon ion laser Raman spectroscopy. A peak at 1580 cm$^{-1}$ is derived from a crystalline portion having hexagonal symmetry which has a structure close to a graphite structure. A peak at 1360 cm$^{-1}$ is derived from an amorphous portion where crystallinity of carbon material falls into disorder. When the ratio of the amorphous portion in a surface layer is higher, R is greater.

When a carbon material is used having an R value of not less than 0.2 of which crystallinity on the surface is small, a uniform fine surface film having excellent mobility of lithium ion is obtained and decomposition of γ-butyrolactone in the interface between the negative electrode and the nonaqueous electrolyte is suppressed. However, when R is too great, the surface of the carbon material is very amorphous, and charge discharge efficiency is deteriorated. Therefore, it is preferred that carbon material having R in a range of 0.2~0.8, more preferably, in a range of 0.3~0.6, is used.

To obtain a lithium secondary battery having high charge and discharge capacity, graphite is preferred as the carbon material. Especially, a carbon material having a spacing of crystalline (002) planes ($d_{002}$) observed by X-ray diffraction analysis in a range of 0.335~0.338 nm, and a lamination layer thickness in the direction of the c axis (Lc) of not less than 30 nm is preferred. A carbon material having $d_{002}$ in a range of 0.335~0.336 nm and an Lc of 100 nm or greater is more preferable. A carbon material having a ratio ($I_{110}/I_{002}$) of peak intensity of crystalline (110) planes ($I_{110}$) to peak intensity of crystalline (002) planes ($I_{002}$) in a range of $5 \times 10^{-3} \sim 1.5 \times 10^{-2}$ is preferable.

The carbon material having an R value of not less than 0.2 can be prepared by coating part or an entire surface of a first carbon material having high crystallinity as a core with a second carbon material having a smaller crystallinity than the first material. This makes it possible to control crystallinity of the surface of the carbon material and to provide a lithium secondary battery having excellent discharge characteristics.

Regarding how to coat the first carbon material with the second carbon material, carbonizing the first carbon material mixed with an organic compound, CVD, and the like can be illustrated. Concretely, the first carbon material is immersed in pitch or tar, or in an organic solvent, for example, methanol, ethanol, benzene, acetone, toluene, and the like, containing phenol-aldehyde resin, fulfuryl alcohol resin, carbon black, vinylidene chloride, cellulose, and the like, and is carbonized at 500° C.~1,800° C., preferably 700° C.~1,400° C., in an inert gas atmosphere.

If an amount of vinylene carbonate and vinyl ethylene carbonate added to the nonaqueous electrolyte is too great, discharge capacity and charge discharge efficiency of the lithium secondary battery are deteriorated. Therefore, 0.1~3 parts by weight of vinylene carbonate and 0.1~8 parts by weight of vinyl ethylene carbonate are preferred.

Other nonaqueous solvents used conventionally for a nonaqueous electrolyte, for example, ethylene carbonate, diethyl carbonate, and the like, can be added to the nonaqueous electrolyte having γ-butyrolactone as the main component. Among the solvents γ-butyrolactone is contained in the largest part by volume. The amount of γ-butyrolactone is not less than 50% by volume in the nonaqueous electrolyte in which γ-butyrolactone is the main solvent. However, if the amount of another nonaqueous solvent added is too great, heat stability of the nonaqueous electrolyte is deteriorated. Therefore, the amount of γ-butyrolactone is preferably not less than 90% by volume, more preferably, not less than 95% by volume, and, most preferably, not less than 97% by volume, in the nonaqueous electrolyte.

Ethylene carbonate works to form a surface film having excellent mobility of lithium ion on the surface of the carbon material when ethylene carbonate is added to the nonaqueous solvent. However, if an excessive amount of ethylene carbonate is used, heat stability of the nonaqueous electrolyte is deteriorated. Therefore, the amount of ethylene carbonate in the nonaqueous solvent is preferably not greater than 10% by volume, preferably not greater than 5% by volume and, most preferably, not greater than 3% by volume.

It is preferred that a surfactant, for example, trioctyl phosphate, and the like, is added to the nonaqueous electrolyte to improve wettability of a separator.

As a solute in the nonaqueous electrolyte, a solute conventionally used for a lithium secondary battery can be used. $LiPF_6$, $LiAsF_6$, $LiBF_4$, $LiCF_3SO_3$, $LiN(C_lF_{2l+1}SO_2)(C_mF_{2m+1}SO_2)$ (wherein l and m are each an integer of 1 or more), $LiC(C_pF_{2p+1}SO_2)(C_qF_{2q+1}SO_2)(C_rF_{2r+1}SO_2)$ (wherein p, q and r are each an integer of 1 or more), and the like, can be used alone or in various combinations thereof. The concentration of the solute can also be a conventional concentration for a nonaqueous electrolyte, i.e., in a range of 0.1~1.5 mol/l, preferably 0.5~1.5 mol/l.

There are no limitations with respect to an active material for the positive electrode. Materials conventionally used as an active material for a positive electrode in a lithium secondary battery can be used. For example, a lithium transition metal oxide, for example, lithium cobalt oxide ($LiCoO_2$), lithium nickel oxide ($LiNiO_2$), lithium manganese oxide ($LiMn_2O_4$), and the like, can be illustrated.

DESCRIPTION OF PREFERRED EMBODIMENTS

EXAMPLE

Examples of a lithium secondary battery of the present invention are explained in detail below and are compared with those of comparative examples to show that discharge characteristics are improved. It is of course understood that the present invention is not limited to these embodiments and can be modified within the spirit and scope of the appended claims.

Example 1

A flat coin shaped test battery as shown in FIG. 1 having a diameter of 24.0 mm and a thickness of 3.0 mm was prepared.

A graphite powder ($d_{002}$=0.336 nm, Lc>100 nm) was immersed in melted pitch and was dried to obtain graphite coated with pitch. The graphite coated with pitch was carbonized at 1,100° C. for two hours to prepare graphite coated with low crystalline carbon thereon as a carbon material. An intensity ratio (R) ($I_D/I_G$) obtained by Raman spectroscopy of the carbon material was 0.40. A ratio ($I_{110}/I_{002}$) of a peak intensity of crystalline (110) planes ($I_{110}$) to a peak intensity of crystalline (002) planes ($I_{002}$) by X-ray diffraction analysis of the carbon material was $1.1 \times 10^{-2}$.

97.5 parts by weight of the carbon material, 1 part by weight of a styrene-butadiene rubber, and 1.5 part by weight of carboxymethylcellulose were mixed and water was added to the mixture to prepare a slurry. The slurry was coated on one side of a current collector made of copper, was rolled with pressure after drying, and was cut into a disc having a diameter of 20 mm to prepare a working electrode which would act as a negative electrode.

A lithium rolled plate having a desired thickness and cut into a disk was used as a counter electrode.

Lithium tetrafluoroborate ($LiBF_4$) was dissolved in an electrolyte of γ-butyrolactone to provide a $LiBF_4$ concentration of 1.2 mol/l to prepare a nonaqueous electrolyte. 2 Parts by weight of vinylene carbonate (VC), 5 parts by weight of vinyl ethylene carbonate (VEC) and trioctyl phosphate as a surfactant were added to the nonaqueous electrolyte (100 parts by weight).

A separator 3 made of polyethylene porous film was impregnated with the nonaqueous electrolyte prepared above. The separator 3 was inserted between the counter electrode 1 which acted as a positive electrode and the working electrode 2 which acted as a negative electrode. The electrodes and separator were placed in a battery can 4 to have a current collector 2a of the working electrode 2 contact a bottom part 4a of the battery can 4 and have the counter electrode 1 contact a upper lid 4b of the battery can 4. The bottom part 4a and the upper lid 4b were electrically insulated by an insulation packing 5.

Examples 2~4 and Comparative Examples 1 and 2

Batteries of Examples 2~4 and Comparative Examples 1 and 2 were prepared in the same manner as Example 1 except that the amounts of VC and VEC in the nonaqueous electrolytes were varied as explained below.

The amounts of VC and VEC based on 100 parts by weight of the nonaqueous electrolyte were as follows:

Example 2: 2 parts by weight of VC and 10 parts by weight of VEC

Example 3: 4 parts by weight of VC and 5 parts by weight of VEC

Example 4: 4 parts by weight of VC and 10 parts by weight of VEC

Comparative Example 1: no VC and 5 parts by weight of VEC

Comparative Example 2: no VC and 10 parts by weight of VEC

Using each battery of Examples 1~4 and Comparative Examples 1 and 2, lithium ions were occluded by the carbon material of the working electrode to a voltage of the working electrode of 0.0 V relative to the counter electrode from the counter electrode at a current density of 0.5 mA/cm$^2$, lithium ions were occluded by the carbon material of the working electrode to a voltage of the working electrode of 0.0 V relative to the counter electrode from the counter electrode at a current density of 0.25 mA/cm$^2$, and lithium ions were occluded by the carbon material of the working electrode to a voltage of the working electrode of 0.0 V relative to the counter electrode from the counter electrode at a current density of 0.125 mA/cm$^2$ to obtain a capacity (Q1 mAh/g) of the carbon material of each battery.

Then lithium ions were released from the carbon material in which lithium ions were occluded to a voltage of the working electrode relative to the counter electrode of 1.0 V at a constant current having a current density of 0.25 mA/cm$^2$. A capacity (Q2 mAh/g) of the carbon material of each battery was obtained when lithium ions were released from the carbon material of the working electrode. A ratio of the capacity Q2 to the capacity Q1 [(Q2/Q1)×100] was calculated as a charge discharge efficiency of lithium ion of the carbon material. The results are shown in Table 1.

An alternating current impedance at an amplitude of 10 mV in a frequency band of 20 kHz~10 mHz was measured to obtain reaction resistance (Ω·cm$^2$) of each battery of Examples 1~4 and Comparative Examples 1 and 2. The results are shown in Table 1.

TABLE 1

| | VC parts by weight | VEC parts by weight | Q2 (mAh/g) | Charge Discharge Efficiency (%) | Reaction Resistance (Ω·cm$^2$) |
|---|---|---|---|---|---|
| Example 1 | 2 | 5 | 366 | 93.5 | 54 |
| Example 2 | 2 | 10 | 360 | 93.1 | 63 |
| Example 3 | 4 | 5 | 353 | 92.9 | 52 |
| Example 4 | 4 | 10 | 354 | 93.1 | 47 |
| Comparative Example 1 | 0 | 5 | 356 | 93.9 | 88 |
| Comparative Example 2 | 0 | 10 | 358 | 93.7 | 99 |

As is clear from the results shown in Table 1, batteries of Examples 1~4 wherein the nonaqueous electrolytes included both VC and VEC have less reaction resistance as compared to batteries of Comparative Examples 1 and 2 wherein the nonaqueous electrolytes include only VEC. Discharge characteristics of the batteries of Examples 1~4 are significantly improved.

When comparing the batteries of Examples 1~4, it is noted that the battery of Example 1 wherein VC is contained in a range of 0.1~3 parts by weight and VEC is contained in a range of 0.1~8 parts by weight based on 100 parts by weight of the nonaqueous electrolyte has a higher capacity Q2 and charge discharge efficiency as compared to the batteries of Examples 2~4.

Although the batteries described above were used for evaluation in the Examples, when a lithium transition metal oxide, for example, LiCoO$_2$, LiNiO$_2$, LiMn$_2$O$_4$, and the like, is used for a positive electrode, similar results are obtained. That is, reaction resistance is reduced, occluding and releasing of lithium ion by a carbon material used for a negative electrode occur properly and excellent charge discharge characteristics are obtained.

Advantages of the Invention

A lithium secondary battery of the present invention uses a nonaqueous electrolyte comprising at least 0.1 part by weight of vinylene carbonate and at least 0.1 part by weight of vinyl ethylene carbonate in 100 parts by weight of the nonaqueous electrolyte. Even if a carbon material having an R value ($I_D/I_G$) of 0.2 or higher is used as an active material of a negative electrode, a surface film having excellent mobility of lithium ion is properly formed on the surface of the carbon material and occluding and releasing of lithium ion by the carbon material occur properly and a side reaction, decomposition of γ-butyrolactone, is suppressed to obtain a lithium secondary battery having excellent heat stability as well as having sufficient discharge characteristics and storage characteristics.

What is claimed is:

1. A lithium secondary battery comprising a positive electrode, a negative electrode including a carbon material having a ratio ($I_D/I_G$) of a Raman spectrum intensity (R) obtained by Raman spectroscopy of 0.2 or greater as an active material, and a nonaqueous electrolyte comprising a solute dissolved in a nonaqueous solvent, wherein the nonaqueous solvent consists of not less than 97 % by volume of γ-butyrolactone, and at least 0.1 part by weight of vinylene carbonate and at least 0.1 part by weight of vinyl ethylene carbonate in 100 parts by weight of the nonaqueous electrolyte.

2. The lithium secondary battery according to claim 1, wherein 0.1~3 parts by weight of vinylene carbonate and 0.1~8 parts by weight of vinyl ethylene carbonate are contained in the nonaqueous electrolyte.

* * * * *